(12) United States Patent
Wellenkotter et al.

(10) Patent No.: US 8,532,890 B2
(45) Date of Patent: Sep. 10, 2013

(54) DRIVEN WHEEL TORQUE ESTIMATION SYSTEMS AND METHODS

(75) Inventors: Kurt Alfred Wellenkotter, Beverly Hills, MI (US); Dongxu Li, Warren, MI (US)

(73) Assignee: GM Global Technology Operations LLC

( * ) Notice: Subject to any disclaimer, the term of this patent is extended or adjusted under 35 U.S.C. 154(b) by 19 days.

(21) Appl. No.: 13/293,711

(22) Filed: Nov. 10, 2011

(65) Prior Publication Data

US 2013/0124056 A1    May 16, 2013

(51) Int. Cl.
*G06F 7/00* (2006.01)

(52) U.S. Cl.
USPC .......................................................... 701/51

(58) Field of Classification Search
USPC ............................................................ 701/51
See application file for complete search history.

(56) References Cited

U.S. PATENT DOCUMENTS

| | | | |
|---|---|---|---|
| 5,508,923 A * | 4/1996 | Ibamoto et al. | 701/70 |
| 5,754,967 A * | 5/1998 | Inoue et al. | 701/54 |
| 6,278,915 B1 * | 8/2001 | Deguchi et al. | 701/22 |
| 6,634,451 B2 * | 10/2003 | Sakakiyama | 180/197 |
| 7,559,259 B2 * | 7/2009 | Fruhwirth et al. | 73/862.321 |

FOREIGN PATENT DOCUMENTS

JP    2007298014 A    * 11/2007

OTHER PUBLICATIONS

U.S. Appl. No. 12/892,838, filed Sep. 28, 2010, Dongxu Li et al.
U.S. Appl. No. 12/892,832, filed Sep. 28, 2010, Dongxu Li et al.

* cited by examiner

*Primary Examiner* — Mary Cheung
*Assistant Examiner* — Anne Mazzara (57) ABSTRACT

A wheel position determination module determines first and second wheel positions based on first and second signals generated using first and second wheel speed sensors. The first and second wheel speed sensors generate the first and second signals based on rotation of driven wheels of the vehicle, respectively. The wheel position determination module determines third and fourth wheel positions based on third and fourth signals generated using third and fourth wheel speed sensors. The third and fourth wheel speed sensors generate the third and fourth signals based on rotation of other wheels of the vehicle, respectively. A first average determination module determines a first average of the first and second wheel positions. A second average determination module determines a second average of the third and fourth wheel positions. An estimation module selectively generates an estimate of torque at the driven wheels based on the first and second averages.

20 Claims, 6 Drawing Sheets

DRIVEN WHEEL TORQUE ESTIMATION SYSTEMS AND METHODS

FIELD

The present disclosure is related to internal combustion engines and more particularly to torque estimation systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine combusts an air/fuel mixture to generate drive torque. Torque output by the engine may be provided to a transmission. Torque input to the transmission may be transferred through the transmission via gears selected within the transmission. A differential receives torque output by the transmission and supplies torque to half-shafts. The half-shafts drive wheels of the vehicle to propel the vehicle.

One or more vehicle control modules may use torque data in controlling associated vehicle systems. For example only, a transmission control module may control performance of a gear shift based on torque data. Controlling how the gear shift is performed based on the torque data may help limit noise, vibration, and/or harshness experienced within a passenger cabin of the vehicle. The transmission control module may also use torque data for one or more other reasons, such as to detect a tie-up condition, which may be used to determine when a clutch is filled.

SUMMARY

A wheel position determination module determines first and second wheel positions based on first and second signals generated using first and second wheel speed sensors. The first and second wheel speed sensors generate the first and second signals based on rotation of driven wheels of the vehicle, respectively. The wheel position determination module determines third and fourth wheel positions based on third and fourth signals generated using third and fourth wheel speed sensors. The third and fourth wheel speed sensors generate the third and fourth signals based on rotation of other wheels of the vehicle, respectively. A first average determination module determines a first average of the first and second wheel positions. A second average determination module determines a second average of the third and fourth wheel positions. An estimation module selectively generates an estimate of torque at the driven wheels based on the first and second averages.

A method for a vehicle includes: determining first and second wheel positions based on first and second signals generated using first and second wheel speed sensors, wherein the first and second wheel speed sensors generate the first and second signals based on rotation of driven wheels of the vehicle, respectively; determining third and fourth wheel positions based on third and fourth signals generated using third and fourth wheel speed sensors, wherein the third and fourth wheel speed sensors generate the third and fourth signals based on rotation of other wheels of the vehicle, respectively; determining a first average wheel position based on the first and second wheel positions; determining a second average wheel position based on the third and fourth wheel positions; selectively generating an estimate of torque at the driven wheels based on the first and second average wheel positions; and selectively adjusting at least one operating parameter of the vehicle based on the estimate of the torque.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A vehicle may include two driven wheels and two other wheels. The other wheels may be driven or undriven. A wheel speed sensor may be associated with each of the wheels of the vehicle. A wheel speed sensor generates a wheel speed signal based on rotation of the associated wheel. A control module may determine a position, a speed, and/or an acceleration of the wheel based on the wheel speed signal.

A module of the vehicle receives the wheel speed signals generated based on rotation of the driven wheels and the other wheels. The module determines first and second wheel positions based on the wheel speed signals generated based on rotation of the driven wheels. The module determines third and fourth wheel positions based on the wheel speed signals generated based on rotation of the other wheels.

The module estimates torque at the driven wheels based on the first, second, third, and fourth wheel positions. One or more operating parameters of the vehicle may be selectively adjusted based on the estimated torque at the driven wheels. For example only, a transmission control module may control a clutch during a gear shift based on the estimated torque. For another example only, an engine control module may selectively adjust one or more engine operating parameters based on the estimated torque.

Figure 1:
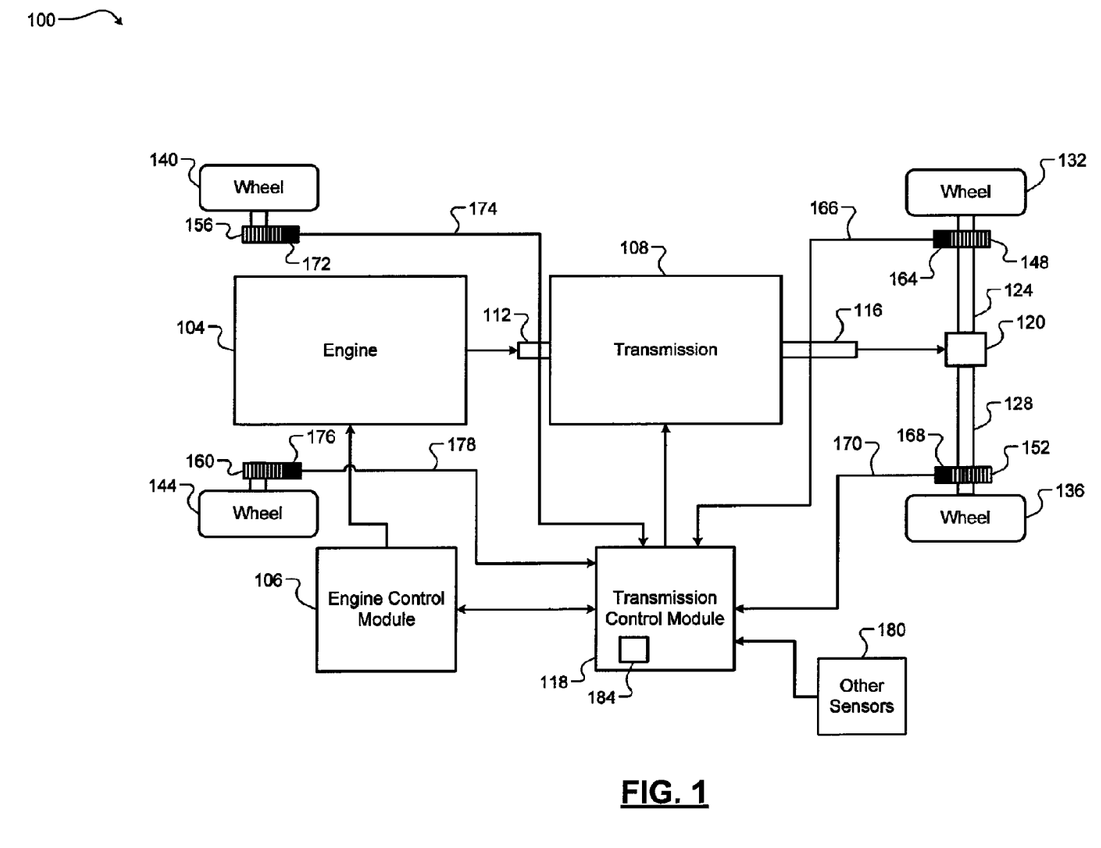
FIG. 1 is a functional block diagram of an example vehicle system according to the present disclosure.

Referring now to FIG. 1, a functional block diagram of an example vehicle system 100 is presented. An engine 104 of a vehicle combusts an air/fuel mixture. Combustion of the air/fuel mixture generates torque. The engine 104 outputs torque to a transmission 108. An engine control module (ECM) 106 controls the torque output of the engine 104. While not shown, the vehicle may additionally or alternatively include one or more electric motors and/or motor/generators.

The transmission 108 receives torque at a transmission input shaft 112. Torque is transferred from the transmission input shaft 112 to a transmission output shaft 116 via a gearset (not shown) that is engaged within the transmission 108. The transmission 108 includes a plurality of gearsets corresponding to one or more forward drive ratios, one or more reverse drive ratios, etc. The transmission 108 may include a manual transmission, an automatic transmission, an auto-manual transmission, a clutch to clutch transmission, a dual clutch transmission, or another suitable type of transmission. A transmission control module 118 may control operation of the transmission 108, such as gear shifts within the transmission 108.

The transmission 108 outputs torque to a differential 120 via the transmission output shaft 116. The differential 120 transfers torque from the transmission output shaft 116 to first and second half-shafts 124 and 128. The first and second half-shafts 124 and 128 transfer torque to first and second driven wheels 132 and 136, respectively. The first and second driven wheels 132 and 136 may be front or rear wheels of the vehicle. The vehicle also includes first and second undriven wheels 140 and 144. While the first and second undriven wheels 140 and 144 will be discussed, all four wheels may be driven wheels in various implementations.

A first toothed wheel 148 rotates with the first driven wheel 132. A second toothed wheel 152 rotates with the second driven wheel 136. A third toothed wheel 156 rotates with the first undriven wheel 140. A fourth toothed wheel 160 rotates with the second undriven wheel 144.

A first wheel speed sensor 164 generates a first driven wheel speed signal 166 based on rotation of the first toothed wheel 148. A second wheel speed sensor 168 generates a second driven wheel speed signal 170 based on rotation of the second toothed wheel 152. A third wheel speed sensor 172 generates a first undriven wheel speed signal 174 based on rotation of the third toothed wheel 156. A fourth wheel speed sensor 176 generates a second undriven wheel speed signal 178 based on rotation of the fourth toothed wheel 160.

While the first wheel speed sensor 164 and the first toothed wheel 148 will be discussed, the other wheel speed sensors may function similarly or identically based on rotation of the associated toothed wheel. The first toothed wheel 148 may include N, approximately equally spaced teeth, where N is an integer greater than one. For example only, N may be 72 in various implementations.

The first wheel speed sensor 164 may include a variable reluctance (VR) sensor, a hall-effect sensor, or another suitable type of position sensor. The first wheel speed sensor 164 generates a pulse in the first driven wheel speed signal 166 each time that one of the teeth of the first toothed wheel 148 passes the first wheel speed sensor 164. Accordingly, each pulse in the first driven wheel speed signal 166 may correspond to an angular rotation of the first driven wheel 132 and the first half-shaft 124 by approximately 360° divided by N.

A control module of the vehicle, such as the transmission control module 118 or a body control module, and/or one or more other modules of the vehicle may receive the first and second driven wheel speed signals 166 and 170 and the first and second undriven wheel speed signals 174 and 178. The control module may also receive signals from one or more other sensors 180.

The control module may include a torque estimation module 184. The torque estimation module 184 estimates torque at the first and second driven wheels 132 and 136 based on the first and second driven wheel speed signals 166 and 170 and the first and second undriven wheel speed signals 174 and 178. The estimated torque at the driven wheels will be referred to as the estimated wheel torque. While the torque estimation module 184 is shown as being implemented within the transmission control module 118, the torque estimation module 184 may implemented in another control module of the vehicle, such as the body control module, or independently.

One of more control modules of the vehicle may adjust one or more parameters based on the estimated wheel torque. For example only, the transmission control module 118 may control and detect filling of a clutch for a gear shift based on the estimated wheel torque. Controlling filling of a clutch of the transmission 108 based on the estimated wheel torque may decrease noise, vibration, and/or harshness experienced during the gear shift. The transmission control module 118 may additionally or alternatively control one or more transmission fluid pressures based on the estimated wheel torque. The transmission control module 118 may additionally or alternatively control a torque converter clutch based on the estimated wheel torque.

The engine control module 106 may selectively adjust one or more engine operating parameters based on the estimated wheel torque. For example only, the engine control module 106 may selectively adjust throttle opening, fuel injection amount, fuel injection timing, spark timing, intake and/or exhaust valve lift and duration, output of a boost device, and/or other suitable engine operating parameters.

Figure 2:
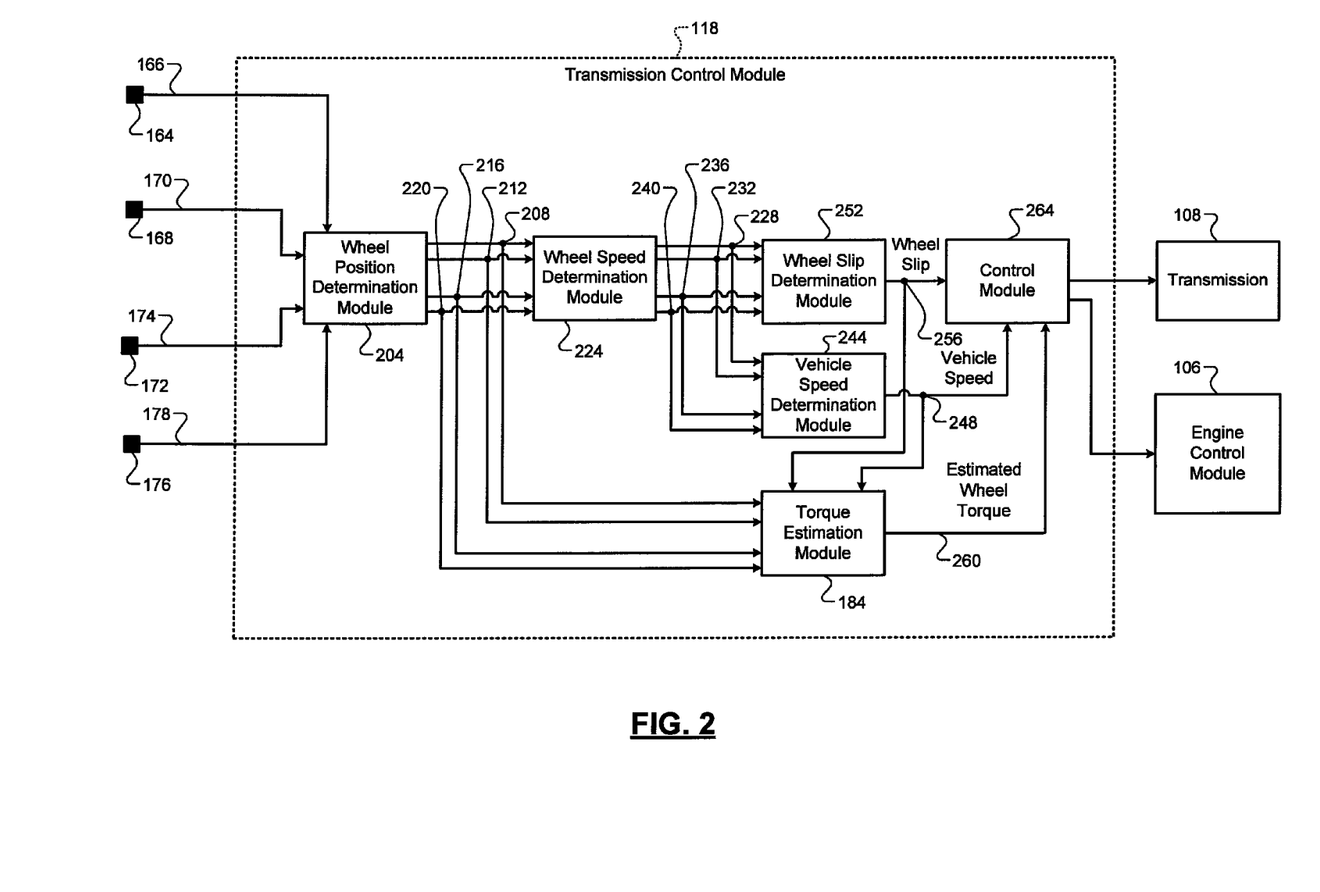
FIG. 2 is a functional block diagram of an example transmission control module according to the present disclosure.

Referring now to FIG. 2, a functional block diagram of an example implementation of the transmission control module 118 is presented. A wheel position determination module 204 (see also FIG. 3) receives the first and second driven wheel speed signals 166 and 170. The wheel position determination module 204 also receives the first and second undriven wheel speed signals 174 and 178.

The wheel position determination module 204 determines a first wheel position 208 based on the first driven wheel speed signal 166. The first wheel position 208 indicates a rotational position of the first driven wheel 132. The wheel position determination module 204 determines a second wheel position 212 based on the second driven wheel speed signal 170. The second wheel position 212 indicates a rotational position of the second driven wheel 136.

The wheel position determination module 204 determines a third wheel position 216 based on the first undriven wheel speed signal 174. The third wheel position 216 indicates a rotational position of the first undriven wheel 140. The wheel position determination module 204 determines a fourth wheel position 220 based on the second undriven wheel speed signal 178. The fourth wheel position 220 indicates a rotational position of the second undriven wheel 144.

A wheel speed determination module 224 determines a first driven wheel speed 228 based on the first wheel position 208. For example only, the wheel speed determination module 224 may determine the first driven wheel speed 228 based on a difference between two values of the first wheel position 208 divided by a period between when the two values occurred. The first driven wheel speed 228 indicates a rotational speed of the first driven wheel 132.

The wheel speed determination module 224 determines a second driven wheel speed 232 based on the second wheel position 212. For example only, the wheel speed determination module 224 may determine the second driven wheel speed 232 based on a difference between two values of the second wheel position 212 divided by a period between when the two values occurred. The second driven wheel speed 232 indicates a rotational speed of the second driven wheel 136.

The wheel speed determination module 224 determines a first undriven wheel speed 236 based on the third wheel position 216. For example only, the wheel speed determination module 224 may determine the first undriven wheel speed 236 based on a difference between two values of the third wheel position 216 divided by a period between when the two values occurred. The first undriven wheel speed 236 indicates a rotational speed of the first undriven wheel 140.

The wheel speed determination module 224 determines a second undriven wheel speed 240 based on the fourth wheel position 220. For example only, the wheel speed determination module 224 may determine the second undriven wheel speed 240 based on a difference between two values of the fourth wheel position 220 divided by a period between when the two values occurred. The second undriven wheel speed 240 indicates a rotational speed of the second undriven wheel 144.

A vehicle speed determination module 244 may determine a vehicle speed 248 based on the first driven wheel speed 228, the second driven wheel speed 232, the first undriven wheel speed 236, and/or the second undriven wheel speed 240. For example only, the vehicle speed determination module 244 may determine the vehicle speed 248 based on, or set the vehicle speed 248 to, an average of the first driven wheel speed 228, the second driven wheel speed 232, the first undriven wheel speed 236, and the second undriven wheel speed 240.

A wheel slip determination module 252 may determine a wheel slip 256 based on the first driven wheel speed 228, the second driven wheel speed 232, the first undriven wheel speed 236, and/or the second undriven wheel speed 240. For example only, the wheel slip determination module 252 may determine the wheel slip 256 based on, or set the wheel slip 256 to, a difference between an average of the first and second driven wheel speeds 228 and 232 and an average of the first and second undriven wheel speed 236 and 240.

The torque estimation module 184 (see also FIG. 5) determines the estimated wheel torque 260 based on the first driven wheel speed 228, the second driven wheel speed 232, the first undriven wheel speed 236, and the second undriven wheel speed 240. The torque estimation module 184 may selectively enable and disable the determination of the estimated wheel torque 260 based on the vehicle speed 248 and/or the wheel slip 256.

A control module 264 may selectively control operation of the transmission 108 based on the estimated wheel torque 260. The control module 264 may also selectively output the estimated wheel torque 260 for one or more modules of the vehicle, such as the engine control module 106. Other modules of the vehicle may take one or more actions based on the estimated wheel torque 260. For example only, the engine control module 106 may selectively adjust one or more engine operating parameters based on the estimated wheel torque 260.

Figure 3:
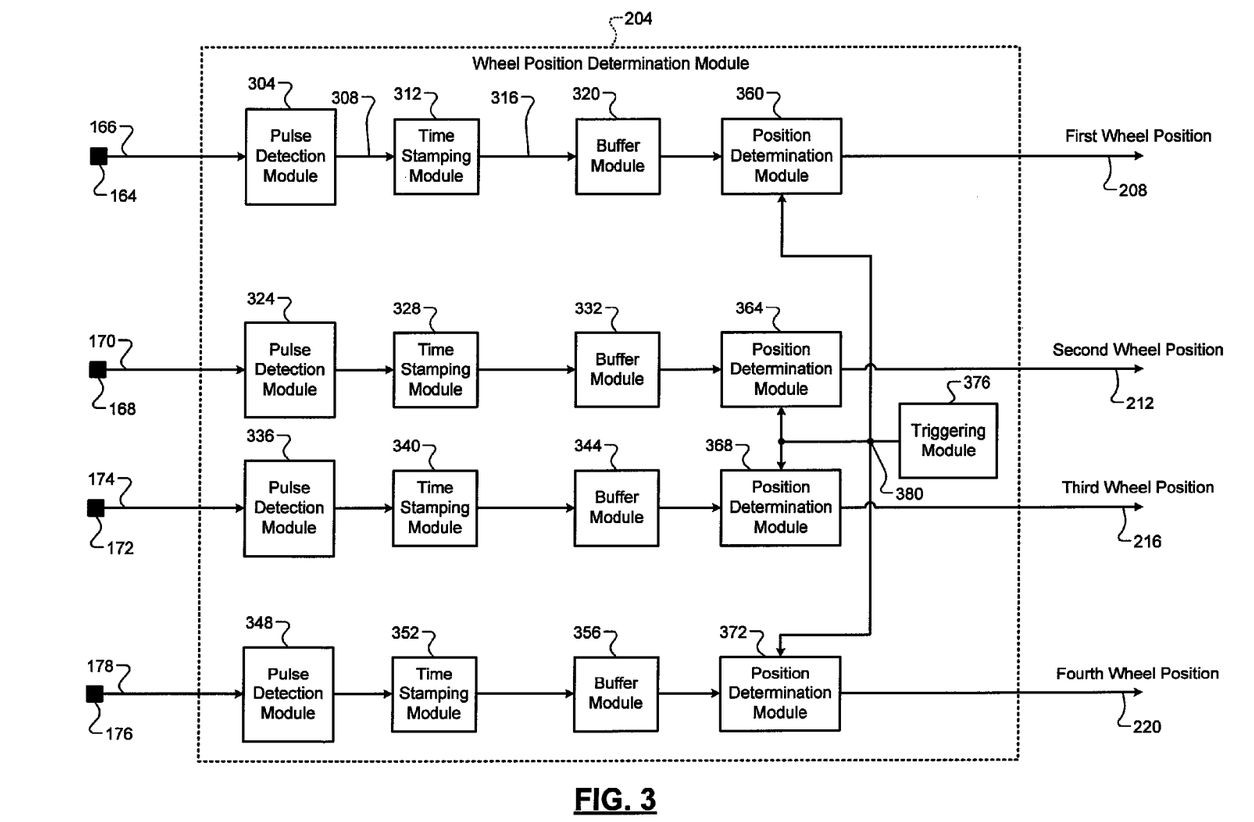
FIG. 3 is a functional block diagram of an example wheel speed determination module according to the present disclosure.

Referring now to FIG. 3, a functional block diagram of an example implementation of the wheel position determination module 204 is presented. A first pulse detection module 304 receives the first driven wheel speed signal 166 generated using the first wheel speed sensor 164. The first pulse detection module 304 may generate an indicator 308 when a pulse is detected in the first driven wheel speed signal 166. The first pulse detection module 304 may generate an indicator each time that a pulse is detected in the first driven wheel speed signal 166.

A first time stamping module 312 generates a time stamp 316 when a pulse is detected in the first driven wheel speed signal 166. The first time stamping module 312 generates a time stamp each time that a pulse is detected in the first driven wheel speed signal 166. The first time stamping module 312 stores the timestamps in a first buffer module 320.

Based on the second driven wheel speed signal 170, a second pulse detection module 324 and a second time stamping module 328 may function similarly or identically to the first pulse detection module 304 and the first time stamping module 312. In this manner, time stamps corresponding to pulses detected in the second driven wheel speed signal 170 are stored in a second buffer module 332.

Based on the first undriven wheel speed signal 174, a third pulse detection module 336 and a third time stamping module 340 may function similarly or identically to the first pulse detection module 304 and the first time stamping module 312. In this manner, time stamps corresponding to pulses detected in the first undriven wheel speed signal 174 are stored in a third buffer module 344.

Based on the second undriven wheel speed signal 178, a fourth pulse detection module 348 and a fourth time stamping module 352 may function similarly or identically to the first pulse detection module 304 and the first time stamping module 312. In this manner, time stamps corresponding to pulses detected in the second undriven wheel speed signal 178 are stored in a fourth buffer module 356.

First, second, third, and fourth position determination modules 360, 364, 368, and 372 determine the first, second, third, and fourth wheel positions 208, 212, 216, and 220, respectively. The first, second, third, and fourth position determination modules 360, 364, 368, and 372 determine the first, second, third, and fourth wheel positions 208, 212, 216, and 220 when triggered by a triggering module 376.

The triggering module 376 triggers the first, second, third, and fourth position determination modules 360, 364, 368, and 372 every predetermined period. For example only, the triggering module 376 may trigger the first, second, third, and fourth position determination modules 360, 364, 368, and 372 every 25 milliseconds (ms) or at another suitable frequency. The predetermined period may be a fixed value or a variable. The predetermined period may be variable, for example, based on the vehicle speed 248. The triggering module 376 may trigger the first, second, third, and fourth position determination modules 360, 364, 368, and 372, for example, by setting a trigger 380 to an active state or in another suitable manner.

Figure 4:
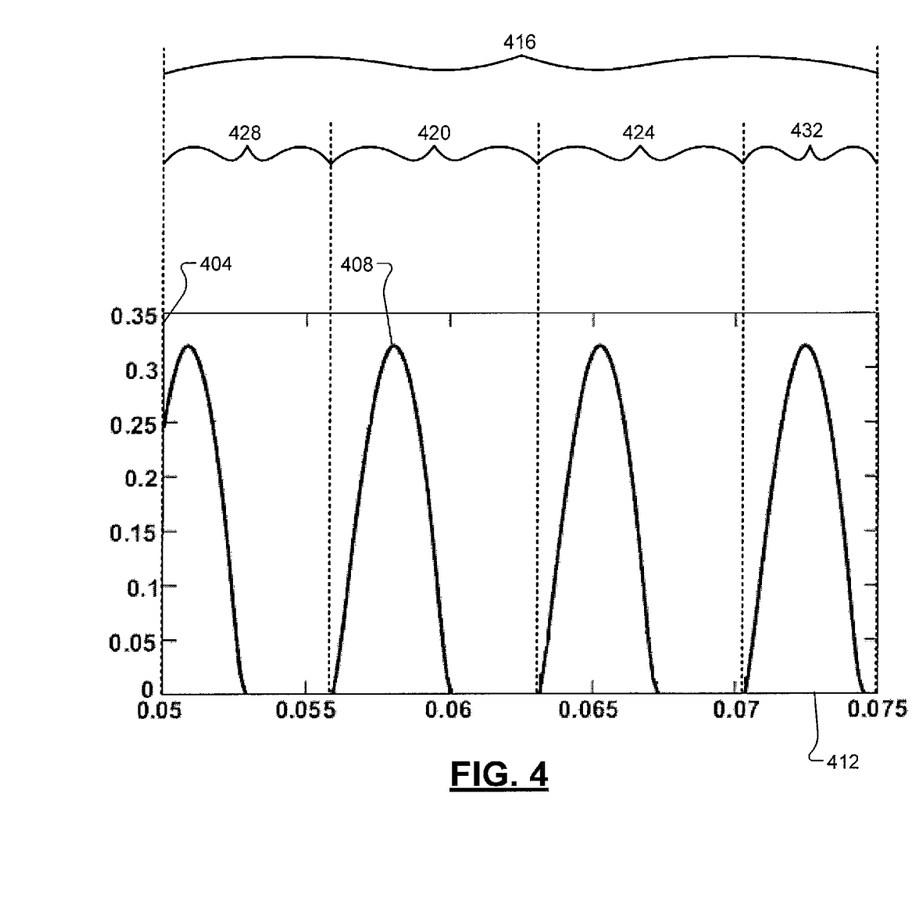
FIG. 4 is a graph of magnitude of an example wheel speed signal as a function of time.

FIG. 4 includes a graph of magnitude 404 of an example wheel speed signal 408 as a function of time 412 during one 25 ms period 416. With continuing reference to FIG. 3, the example wheel speed signal 408 may include one or more complete pulses during each predetermined period. For example, the example wheel speed signal 408 includes first and second complete pulses defined by first period 420 and second period 424, respectively, during the period 416.

The example wheel speed signal 408 may also include one or more partial pulses during each predetermined period. For example, the example wheel speed signal 408 includes an initial partial pulse defined by third period 428 and an ending partial pulse defined by fourth period 432. While the functionality of the first position determination module 360 will be described in conjunction with determining the first wheel position 208, the second, third, and fourth position determination modules 364, 368, and 372 may function similarly to determine the second, third, and fourth wheel positions 212, 216, and 220, respectively.

The first position determination module 360 determines the first wheel position 208 for a current predetermined period (n) based on the timestamps stored in the first buffer module 320. More specifically, the first position determination module 360 determines the first wheel position 208 based on the first wheel position 208 for the last predetermined period (n−1) and an angular rotation of the first driven wheel 132 during the current predetermined period (n).

For example only, the first position determination module 360 may determine the angular rotation of the first driven wheel 132 based on the equation:

$$\Phi_{TOTAL}(n) = \frac{\Phi_{INIT}(n) + \Phi_{END}(n) + \# \text{ Complete}(n)}{\text{Total\# Teeth}},$$

where $\phi_{TOTAL}(n)$ is a fraction of one complete rotation of the first driven wheel 132 experienced during the current predetermined period (n), $\phi_{INIT}(n)$ is the fraction of one complete pulse that corresponds to the initial partial pulse during the current predetermined period (n), $\phi_{END}(n)$ is the fraction of one complete pulse that corresponds to the ending partial pulse during the current predetermined period (n), #Complete (n) is the number of complete pulses that occurred during the current predetermined period (n), and Total#Teeth is the total number of teeth of the first toothed wheel 148.

$\phi_{INIT}(n)$ can be determined based on the period of the initial partial pulse and the period of a first complete pulse during the current predetermined period (n). The first complete pulse may be adjacent to the initial partial pulse or contain it. For example only, $\phi_{INIT}(n)$ can be determined using the equation:

$$\Phi_{INT}(n) = \frac{T1}{P1},$$

where T1 is the period of the initial partial pulse that occurs within the current predetermined period (n), and P1 is the period of a relevant complete pulse (e.g., the first complete pulse). For an example only, in FIG. 4, $\phi_{INIT}(n)$ for the initial partial pulse can be determined based on the third period 428 (T1) divided by the first period 420 (P1).

One or more parameters may be corrected to account for tooth-to-tooth variations in various implementations. For example only, $\phi_{INIT}(n)$ can be set using the equation:

$$\phi_{INT}(n)=1-\phi_{END}(n-1),$$

where $\phi_{END}(n-1)$ is the fraction of one complete pulse that corresponds to the ending partial pulse of the last predetermined period (n−1).

$\phi_{END}(n)$ can be determined based on the period of the ending partial pulse and the period of a last complete pulse during the current predetermined period. If only one complete pulse occurred during the current predetermined period (n), the period of the first pulse (P1) may be used as the period of the last complete pulse. The last complete pulse may be adjacent to the ending partial pulse or contain it. For example only, $\phi_{END}(n)$ can be determined using the equation:

$$\Phi_{END}(n) = \frac{T2}{P2},$$

where T2 is the period of the ending partial pulse that occurs within the current predetermined period (n), and P2 is the period of a relevant complete pulse (e.g., the last complete pulse). For an example only, in FIG. 4, $\phi_{END}(n)$ for the ending partial pulse can be determined based on the fourth period 432 divided by the second period 424.

Figure 5:
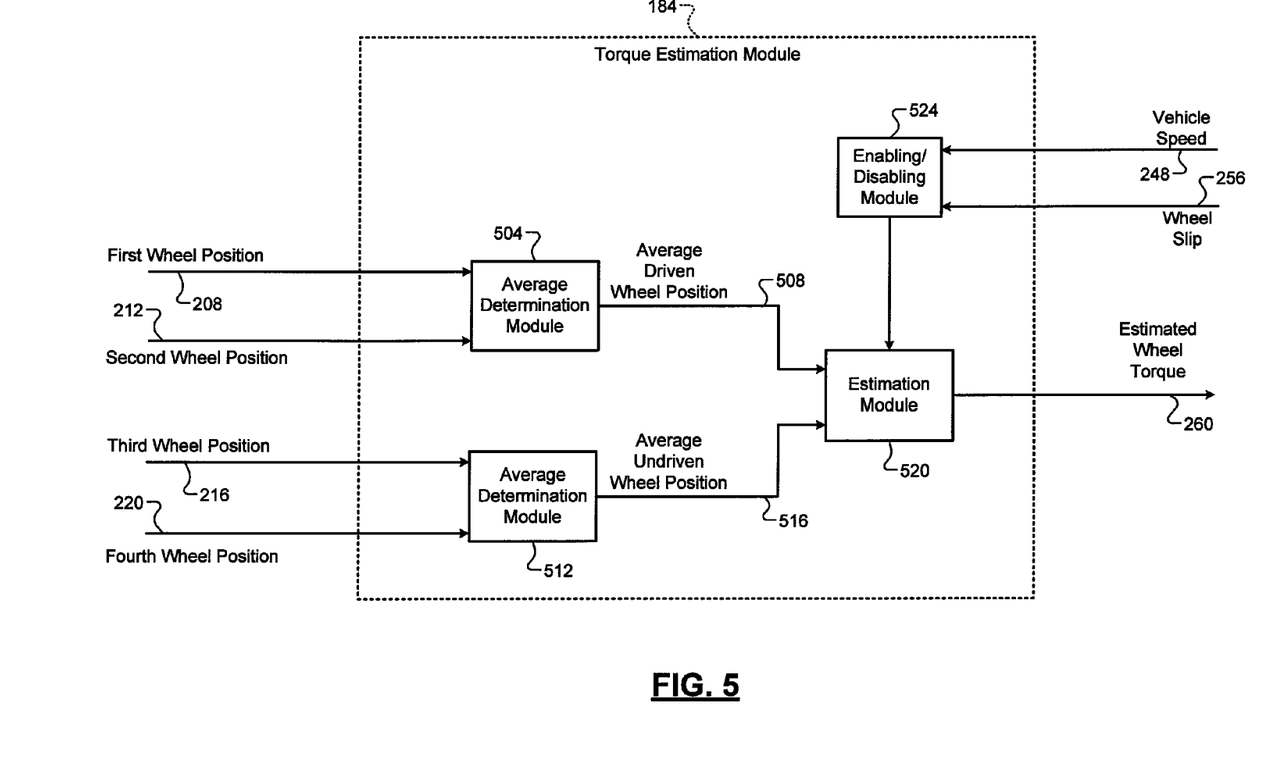
FIG. 5 is a functional block diagram of an example torque estimation module according to the present disclosure.

Referring now to FIG. 5, a functional block diagram of an example implementation of the torque estimation module 184 is presented. A first average determination module 504 determines an average driven wheel position 508 based on the first and second wheel positions 208 and 212. For example only, the first average determination module 504 may set the average driven wheel position 508 equal to an average of the first and second wheel positions 208 and 212.

A second average determination module 512 determines an average undriven wheel position 516 based on the third and fourth wheel positions 216 and 220. For example only, the second average determination module 512 may set the average undriven wheel position 516 equal to an average of the third and fourth wheel positions 216 and 220.

When enabled, an estimation module 520 determines the estimated wheel torque 260 based on the average driven wheel position 508 and the average undriven wheel position 516. For example only, the estimation module 520 may determine the estimated wheel torque 260 using the equation:

$$T_{WHEELS}=K_{EQ}(\text{AVG}_{UNDRIVEN}-\text{AVG}_{DRIVEN})$$

where $T_{WHEELS}$ is the estimated wheel torque 260, $K_{EQ}$ is a torque conversion coefficient, $\text{AVG}_{UNDRIVEN}$ is the average undriven wheel position 516, and AVG$_{DRIVEN}$ is the average driven wheel position 508. Using the above equation to determine the estimated wheel torque 260 may reduce noise. Using the above equation to determine the estimated wheel torque 260 may also render the estimated wheel torque 260 more accurate when the vehicle is turning. When the vehicle is not turning, the estimated wheel torque 260 may be determined by substituting one undriven wheel position and one driven wheel position in place of the average undriven wheel position 516 and the average driven wheel position 508, respectively. K$_{EQ}$ may be a fixed value or a variable value. K$_{EQ}$ may be set, for example, based on compliance of the half-shafts 124 and 128, length of the half-shafts 124 and 128, coefficient of friction of the surface holding the vehicle, grade of the surface, compliance of tires, tire pressure, and/or one or more other parameters. The estimated wheel torque 260 can be described as a relative torque (as opposed to an absolute torque) because it is determined based on the (accumulated) position of the driven wheels relative to the (accumulated) position of the undriven wheels over a period of time.

An enabling/disabling module 524 selectively enables and disables the estimation module 520. The enabling/disabling module 524 may selectively enable and disable the estimation module 520 based on the vehicle speed 248 and/or the wheel slip 256. For example only, the enabling/disabling module 524 may disable the estimation module 520 when the wheel slip 256 is greater than a predetermined value and/or the vehicle speed 248 is less than a predetermined speed. The predetermined speed may be set, for example, based on the predetermined period at which the triggering module 376 generates the trigger 380. For example only, the predetermined speed decreases as the predetermined period increases, and vice versa.

Figure 6:
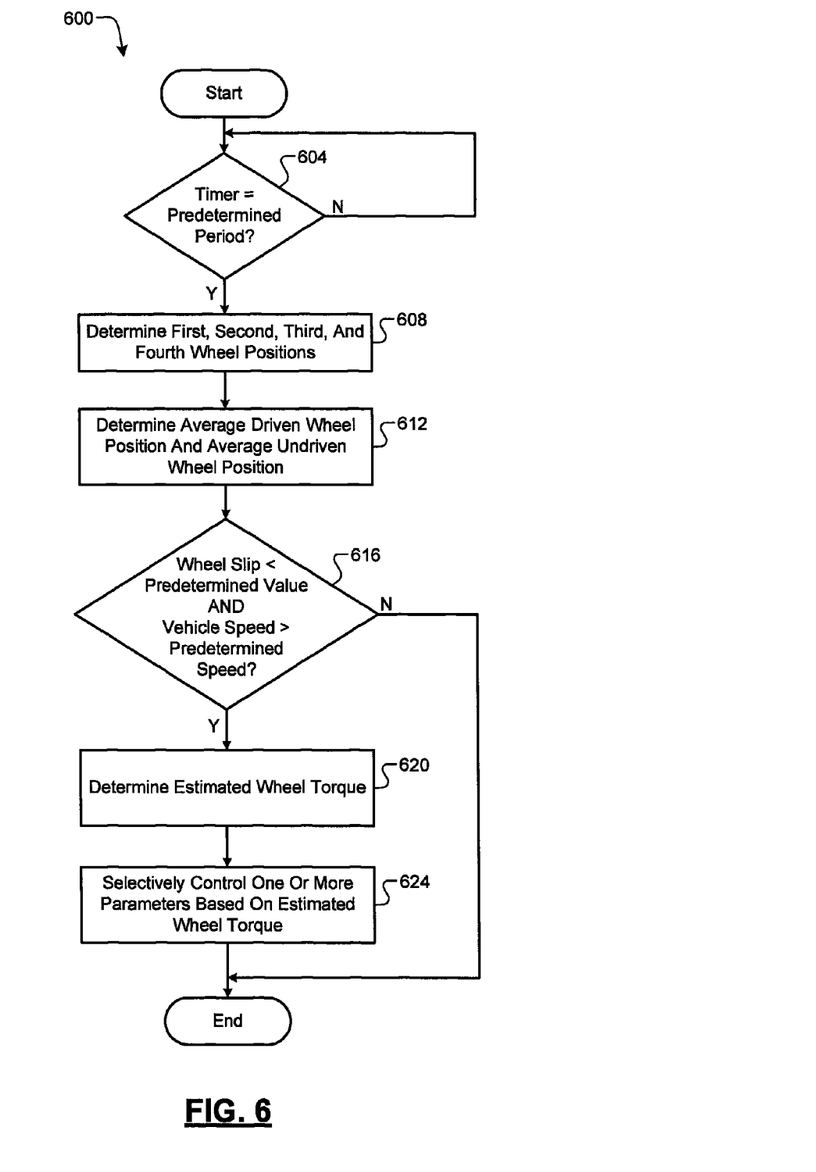
FIG. 6 is a flowchart depicting an example method of estimating torque at driven wheels of a vehicle according to the present disclosure.

Referring now to FIG. 6, a flowchart depicting an example method 600 of selectively estimating torque at wheels of a vehicle and selectively controlling one or more parameters of a vehicle is presented. Control detects pulses in the first, second, third, and fourth wheel speed signals 166, 170, 174, and 178. Control generates a timestamp each time that a pulse is detected.

At 604, control determines whether a timer is equal to the predetermined period. If so, control continues with 608 and control may reset the timer. If false, control may continue detecting pulses and generating time stamps and remain at 604. For example only, the predetermined period may be approximately 25 ms or another suitable value.

At 608, control determines the first, second, third, and fourth wheel positions 208, 212, 216, and 220. Control determines the first wheel position 208 based on the timestamps generated based on the first driven wheel speed signal 166. Control determines the second wheel position 212 based on the timestamps generated based on the second driven wheel speed signal 170. Control determines the third wheel position 216 based on the timestamps generated based on the first undriven wheel speed signal 174. Control determines the fourth wheel position 220 based on the timestamps generated based on the second undriven wheel speed signal 178.

At 612, control determines the average driven wheel position 508 and the average undriven wheel position 512. Control determines the average driven wheel position 508 based on the average of the first and second wheel positions 208 and 212. Control determines the average undriven wheel position 512 based on the average of the third and fourth wheel positions 216 and 220.

Control may determine whether the wheel slip 256 is less than the predetermined value and whether the vehicle speed 248 is greater than the predetermined speed at 616. If both are true, control may continue with 620. If one or both are false, control may end. In this manner, control may refrain from determining and/or using the estimated wheel torque 260 when the wheel slip 256 is greater than the predetermined value and/or the vehicle speed 248 is less than the predetermined speed.

At 620, control determines the estimated wheel torque 260. For example only, control may determine the estimated wheel torque 260 using the equation:

$$T_{WHEELS} = K_{EQ}(AVG_{UNDRIVEN} - AVG_{DRIVEN}),$$

where T$_{WHEELS}$ is the estimated wheel torque 260, K$_{EQ}$ is the torque conversion coefficient, AVG$_{UNDRIVEN}$ is the average undriven wheel position 516, and AVG$_{DRIVEN}$ is the average driven wheel position 508. Control selectively controls one or more parameters based on the estimated wheel torque 260 at 624, and control may end. For example only, control may selectively control one or more transmission fluid pressures based on the estimated wheel torque 260. For another example only, control may selectively adjust one or more engine operating parameters based on the estimated wheel torque 260. While control is shown and discussed as ending, FIG. 6 may be illustrative of one control loop, and control may return to 604.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
   a wheel position determination module:
      that determines first and second wheel positions based on first and second signals generated using first and second wheel speed sensors,
      wherein the first and second wheel speed sensors generate the first and second signals based on rotation of driven wheels of the vehicle, respectively; and
      that determines third and fourth wheel positions based on third and fourth signals generated using third and fourth wheel speed sensors,
      wherein the third and fourth wheel speed sensors generate the third and fourth signals based on rotation of other wheels of the vehicle, respectively;
   a first average determination module that determines a first average wheel position based on the first and second wheel positions;
   a second average determination module that determines a second average wheel position based on the third and fourth wheel positions;
   an estimation module that selectively generates an estimate of torque at the driven wheels based on the first and second average wheel positions; and
   a control module that selectively adjusts at least one operating parameter of the vehicle based on the estimate of the torque.

2. The system of claim 1 wherein the estimation module generates the estimate of the torque further based on a torque conversion coefficient.

3. The system of claim 2 wherein the estimation module sets the estimate of the torque equal to a product of the torque conversion coefficient and a difference between the first and second average wheel positions.

4. The system of claim 1 further comprising an enabling/disabling module that disables the estimation module when a vehicle speed is less than a predetermined speed,
   wherein the predetermined speed is greater than zero.

5. The system of claim 4 further comprising:
a wheel speed determination module that determines first, second, third, and fourth wheel speeds based on the first, second, third, and fourth wheel positions, respectively; and
a vehicle speed determination module that determines the vehicle speed based on at least one of the first, second, third, and fourth wheel speeds.

6. The system of claim 1 further comprising an enabling/disabling module that disables the estimation module when a wheel slip is greater than a predetermined value,
wherein the predetermined value is greater than zero.

7. The system of claim 6 further comprising:
a wheel speed determination module that determines first, second, third, and fourth wheel speeds based on the first, second, third, and fourth wheel positions, respectively; and
a wheel slip determination module that determines the wheel slip based on at least one of the first, second, third, and fourth wheel speeds.

8. The system of claim 1 wherein the control module selectively adjusts at least one operating parameter of an engine of the vehicle based on the estimate of the torque.

9. The system of claim 1 wherein the control module selectively adjusts at least one operating parameter of a transmission of the vehicle based on the estimate of the torque.

10. The system of claim 1 wherein the control module selectively adjusts a clutch pressure based on the estimate of the torque.

11. A method for a vehicle, comprising:
determining, using a wheel position determination module, first and second wheel positions based on first and second signals generated using first and second wheel speed sensors,
wherein the first and second wheel speed sensors generate the first and second signals based on rotation of driven wheels of the vehicle, respectively;
determining, using the wheel position determination module, third and fourth wheel positions based on third and fourth signals generated using third and fourth wheel speed sensors,
wherein the third and fourth wheel speed sensors generate the third and fourth signals based on rotation of other wheels of the vehicle, respectively;
determining, using a first average determination module, a first average wheel position based on the first and second wheel positions;
determining, using a second average determination module, a second average wheel position based on the third and fourth wheel positions;
selectively generating, using an estimation module, an estimate of torque at the driven wheels based on the first and second average wheel positions; and
selectively adjusting, using a control module, at least one operating parameter of the vehicle based on the estimate of the torque.

12. The method of claim 11 further comprising generating the estimate of the torque further based on a torque conversion coefficient.

13. The method of claim 12 further comprising setting the estimate of the torque equal to a product of the torque conversion coefficient and a difference between the first and second average wheel positions.

14. The method of claim 11 further comprising disabling the selectively generating the estimate when a vehicle speed is less than a predetermined speed,
wherein the predetermined speed is greater than zero.

15. The method of claim 14 further comprising:
determining first, second, third, and fourth wheel speeds based on the first, second, third, and fourth wheel positions, respectively; and
determining the vehicle speed based on at least one of the first, second, third, and fourth wheel speeds.

16. The method of claim 11 further comprising disabling the selectively generating the estimate when a wheel slip is greater than a predetermined value,
wherein the predetermined value is greater than zero.

17. The method of claim 16 further comprising:
determining first, second, third, and fourth wheel speeds based on the first, second, third, and fourth wheel positions, respectively; and
determining the wheel slip based on at least one of the first, second, third, and fourth wheel speeds.

18. The method of claim 11 further comprising selectively adjusting at least one operating parameter of an engine of the vehicle based on the estimate of the torque.

19. The method of claim 11 further comprising selectively adjusting at least one operating parameter of a transmission of the vehicle based on the estimate of the torque.

20. The method of claim 11 further comprising selectively adjusting a clutch pressure based on the estimate of the torque.

* * * * *